United States Patent
Squyres et al.

(10) Patent No.: US 8,811,793 B2
(45) Date of Patent: Aug. 19, 2014

(54) CAMERA EVENT LOGGER

(75) Inventors: Phil Squyres, Woodland Hills, CA (US); James Ketcham, Malibu, CA (US); Ian Wayne, Los Angeles, CA (US)

(73) Assignees: Sony Corporation, Tokyo (JP); Sony Pictures Entertainment Inc, Culver City, CA (US)

( * ) Notice: Subject to any disclaimer, the term of this patent is extended or adjusted under 35 U.S.C. 154(b) by 429 days.

(21) Appl. No.: 13/167,616

(22) Filed: Jun. 23, 2011

(65) Prior Publication Data

US 2011/0249128 A1    Oct. 13, 2011

Related U.S. Application Data

(63) Continuation-in-part of application No. PCT/US2009/069485, filed on Dec. 23, 2009, which is a continuation of application No. 12/625,316, filed on Nov. 24, 2009, now Pat. No. 8,520,999.

(60) Provisional application No. 61/140,520, filed on Dec. 23, 2008.

(51) Int. Cl.
*H04N 5/77* (2006.01)
(52) U.S. Cl.
USPC .......................... 386/224; 386/210; 348/207
(58) Field of Classification Search
USPC ............................ 386/207, 210, 224; 348/207
See application file for complete search history.

(56) References Cited

U.S. PATENT DOCUMENTS

| | | | | |
|---|---|---|---|---|
| 3,707,071 A | * | 12/1972 | Walton | 368/159 |
| 5,642,285 A | * | 6/1997 | Woo et al. | 701/470 |
| 6,546,190 B1 | * | 4/2003 | Phillips et al. | 386/201 |
| 6,556,273 B1 | * | 4/2003 | Wheeler et al. | 352/92 |
| 6,600,874 B1 | * | 7/2003 | Fujita et al. | 386/249 |
| 8,392,001 B1 | * | 3/2013 | Isik et al. | 700/42 |
| 2006/0245733 A1 | | 11/2006 | Hino | |
| 2010/0042650 A1 | * | 2/2010 | Roenning et al. | 707/104.1 |

FOREIGN PATENT DOCUMENTS

CN    1848938    10/2006

* cited by examiner

*Primary Examiner* — Thai Tran
*Assistant Examiner* — Jose Mesa
(74) *Attorney, Agent, or Firm* — Procopio, Cory, Hargreaves & Savitch LLP

(57) ABSTRACT

A camera event logger device coupled to a motion picture camera, including: a data port configured to receive control signals to manage the logger device including a particular receive frequency; a radio-frequency receiver configured to receive time signal of the particular receive frequency to enable fine adjustment of a timecode; a timecode manager including a plurality of timecode readers and at least one timecode generator, a first timecode reader of the plurality of timecode readers configured to receive the time signal from the radio-frequency receiver and make the time signal available to the at least one timecode generator, wherein the at least one timecode generator is configured to generate the timecode by conditioning the time signal, the timecode manager configured to receive camera timecode from the motion picture camera, and to send back adjusted camera timecode adjusted in accordance with the conditioned timecode; a processor configured to receive camera status information from the motion picture camera and the conditioned timecode from the timecode manager, wherein the camera status information is tagged with the conditioned timecode and processed to generate metadata files; and a storage unit configured to store the metadata files. Keywords include logger, timecode, and slate.

15 Claims, 4 Drawing Sheets

CAMERA EVENT LOGGER

CROSS-REFERENCE TO RELATED APPLICATIONS

This application is a continuation-in-part application of P.C.T. Application No. PCT/US2009/069485, filed Dec. 23, 2009, and entitled "Camera Event Logger," which claimed priority to U.S. patent application Ser. No. 12/625,316, filed Nov. 24, 2009, which claimed priority to U.S. Provisional Patent Application No. 61/140,520, filed Dec. 23, 2008. This application is also related to U.S. patent application Ser. No. 12/403,173, filed Mar. 12, 2009, entitled "Smart Slate," and U.S. patent application Ser. No. 12/403,210, filed Mar. 12, 2009, entitled "Camera Direct Dailies." The disclosures of the above-referenced applications are incorporated herein by reference.

BACKGROUND

1. Field of the Invention

The present invention relates to movie, video, or television production, and more specifically, to recording information about audio and video sequences as they are captured.

2. Background

In motion picture and videotape production, events of motion picture cameras and video cameras are manually recorded. A slate is often used to identify and mark particular scenes and takes recorded by the motion picture/video camera during production. However, accurate recording of camera events with respect to a reference time is needed.

SUMMARY

In one implementation, a camera event logger device coupled to a motion picture camera is disclosed. The logger device including: a data port configured to receive control signals to manage the logger device including a particular receive frequency; a radio-frequency receiver configured to receive time signal of the particular receive frequency to enable fine adjustment of a timecode; a timecode manager including a plurality of timecode readers and at least one timecode generator, a first timecode reader of the plurality of timecode readers configured to receive the time signal from the radio-frequency receiver and make the time signal available to the at least one timecode generator, wherein the at least one timecode generator is configured to generate the timecode by conditioning the time signal, the timecode manager configured to receive camera timecode from the motion picture camera, and to send back adjusted camera timecode adjusted in accordance with the conditioned timecode; a processor configured to receive camera status information from the motion picture camera and the conditioned timecode from the timecode manager, wherein the camera status information is tagged with the conditioned timecode and processed to generate metadata files; and a storage unit configured to store the metadata files.

In another implementation, a method for logging events of a motion picture camera on a logger device is disclosed. The method including: receiving control signals to manage the logger device including a particular receive frequency; receiving time signal of the particular receive frequency to enable fine adjustment of a timecode; generating the timecode by conditioning the received time signal; receiving camera status information from the motion picture camera and the conditioned timecode, wherein the camera status information is tagged with the conditioned timecode, and processed to generate metadata files; and storing the metadata files.

Other features and advantages of the present invention will become more readily apparent to those of ordinary skill in the art after reviewing the following detailed description and accompanying drawings.

DETAILED DESCRIPTION

Certain implementations as disclosed herein provide techniques for recording information about audio and video sequences as they are captured. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In one implementation, a "camera event" logger device is attached to a motion picture camera. Examples of motion picture cameras include motion film cameras, video cameras, video recorders, motion capture cameras, still-frame cameras, and other cameras used in the production of a motion picture. The logger device includes a high-stability timecode generator with integrated radio frequency receiver, a power management circuitry, computer functionality (processing, memory, input/output), and data transfer interfaces (e.g., wired serial interface, wireless interface).

The logger device provides automated recording of a variety of information during movie or television production. For example, one implementation of a logger device automatically records camera status information tagged with timing information to create metadata files. These metadata files can then be transferred (e.g., by serial data connection or wirelessly) to a companion smart slate (see related case, U.S. patent application Ser. No. 12/403,173) or a media storage system and then associated with corresponding recorded sound and/or video data (e.g., by timestamps). In some implementations, sound is recorded separately from video.

In one particular implementation, the logger device records camera start and stop times (of the video data) based on the timecode values received from a video camera. The timecode values received from the video camera are generated internally by a timecode generator in the video camera. In this implementation, the logger device determines the camera start and stop times by searching for discontinuities in the received timecode from the video camera. The logger device also receives timecode values associated with sound data from sound recording devices (not shown), and records timecode values corresponding to the camera stop. Alternatively, the logger device can record timecode values corresponding to the camera start. In some applications (e.g., in film acquisition), the logger device 100 captures camera start and stop frame counts.

As discussed above, the logger device includes a high-stability timecode manager with an integrated radio frequency receiver. The logger device uses this timecode manager to provide highly stable, conditioned timecode to the video camera for adjusting its timecode.

Figure 1:
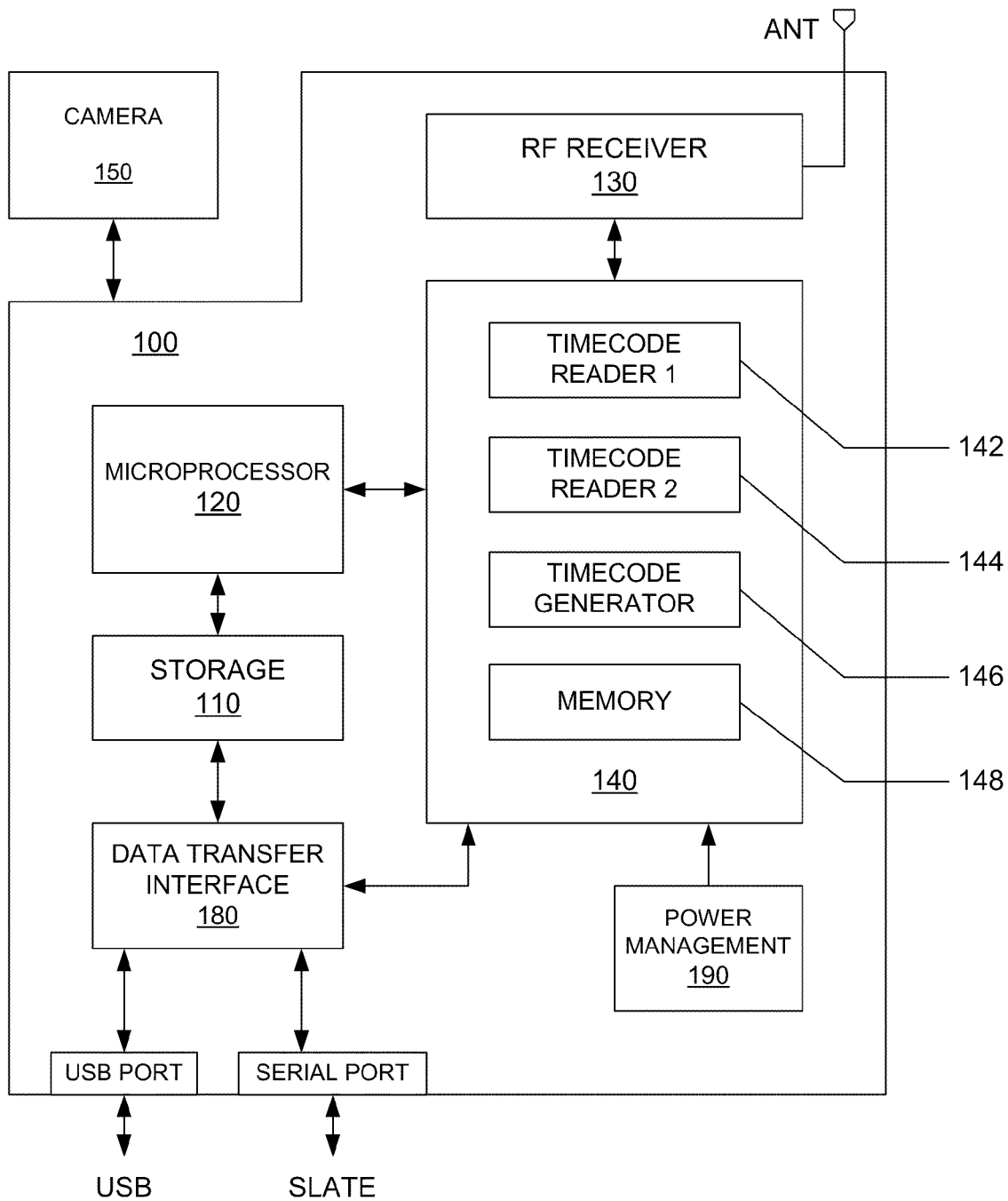
FIG. 1 is a block diagram of a logger device for presenting and recording production information about audio and video sequences during movie or television production in accordance with one implementation of the present invention.

FIG. 1 is a block diagram of a logger device 100 for presenting and recording production information about audio and video sequences during movie or television production in accordance with one implementation of the present invention. The device 100 includes a processor 120, a storage unit 110, and a data transfer interface 180.

In the illustrated implementation of FIG. 1, the logger device 100 is coupled to a motion picture or video camera 150, and provides for automated recording of a variety of information during movie or television production. For example, the logger device 100 automatically records camera status information with timing information to create metadata files. These metadata files are initially stored on a storage unit 110 and passed on to the data transfer interface module 180. The metadata files can then be transferred (e.g., by wired data connection or wirelessly) to a post production facility (e.g., a companion smart slate, a computer, etc.) for storage and association with the corresponding recorded sound and/or video data. The logger device 100 further includes a high-stability timecode manager 140 with an integrated radio frequency receiver 130, and a power management circuitry 190 that manages power for the timecode manager 140.

In one implementation, the timecode manager 140 is a microprocessor-controlled device including a plurality of timecode readers 142, 144 (e.g., Society of Motion Picture and Television Engineers (SMPTE) timecode readers), at least one high stability slave timecode generator 146 (e.g., an SMPTE timecode generator), and memory 148. The radio frequency receiver 130 is configured to receive highly accurate and independent time signal from outside sources to enable fine adjustment of the timecode in the timecode manager 140.

In this implementation, selection of a receive frequency is managed by a serially-connected smart slate connected through a serial port 192, or by a computer attached to a USB port 194. The serial port 192 and the USB port 194 are collectively referred to as a data port. Received timecode is sent to the first timecode reader 142 and made available to continuously supply the onboard generator. This process (sometimes referred to as "conditioning") assures accuracy as good as the transmitted source. When the RF signal is intermittent or not present, the internal generator will "free run" with its accuracy which is only limited by the stability of its onboard oscillator (e.g. a temperature compensated crystal oscillator (TCXO)). The accuracy of the TCXO is further enhanced by software lookup table correction based on ambient temperature measurement made at the processor board. The timecode from this section is output as an audio signal for recording by the camera/video recorder. Thus, the timecode manager 140 generates a highly stable and conditioned timecode for the logger device 100, and also provides this timecode to the video camera 150 for adjusting its timecode.

As described above, the serial port 192 enables connection to the smart slate. This allows all events stored within the storage unit 110 to be downloaded and appended to the slate log file. These values can be streamed into the user bits of the output timecode of the logger device 100. This affords redundancy and utility for applications that do not require a smart slate.

In one implementation, the logger device 100 receives timecode values from the video camera 150 and stores them in the storage unit 110. The timecode manager 140 processes the timecode values stored in the storage unit 110 to determine camera start and stop times (of the video data). The camera start and stop times are determined by the timecode manager 140 by searching for discontinuities in the received timecode from the video camera 150. The logger device 100 also records camera types, timecode types (e.g., frame rates, drop/non-drop frame), and timecode user bits (including real-time clock). Therefore, these values are written at every camera start and/or stop event, and are appended to the internal log file.

In one implementation, the logger device 100 incorporates light emitting diodes (LEDs) to indicate the status of the internal timecode generator. For example, the LEDs can be configured to indicate following configurations: (1) no RF present, and internal timecode generator not jammed; (2) RF present, and internal timecode generator jammed; (3) no RF present, and generator previously jammed and running on internal reference; and (4) low battery.

In another implementation, the timecode manager 140 also receives timecode values associated with sound data from sound recording devices (not shown). The timecode manager 140 uses the received timecode values to determine the sound timecode values corresponding to a camera start time, for example. The timecode manager 140 determines the offset between the video timecode value and the sound timecode value at a particular event (e.g., camera start). The offset is transmitted to the slate and/or the post-production ingest station. The logger device 100 communicates with the slate in such a way that the logger events can be downloaded and appended into the slate's log file to provide a complete, annotated record of events captured by the camera and the sound recording devices. The log events are also encoded into the user bits of the output timecode. This data can be subsequently extracted and decoded for use in the post production process.

In another implementation, a second timecode reader 144 monitors timecode which originates from the camera 150, and logs discontinuities as record "start" and "stop" events. The stop event is used to initiate a capture of the timecode value currently set in the generator. Received timecode value at camera start is calculated from the duration of the take based on camera start and stop events. If desired, real-time clock value embedded in camera user bits may also be captured.

Power for the timecode manager 140 is normally derived from 48 volt microphone phantom power present at the camera/recorder audio input jack. The timecode manager 140 can also be powered by 6-48 volts DC using an alternate connection on the camera interface multi-pin connector.

Figure 2:
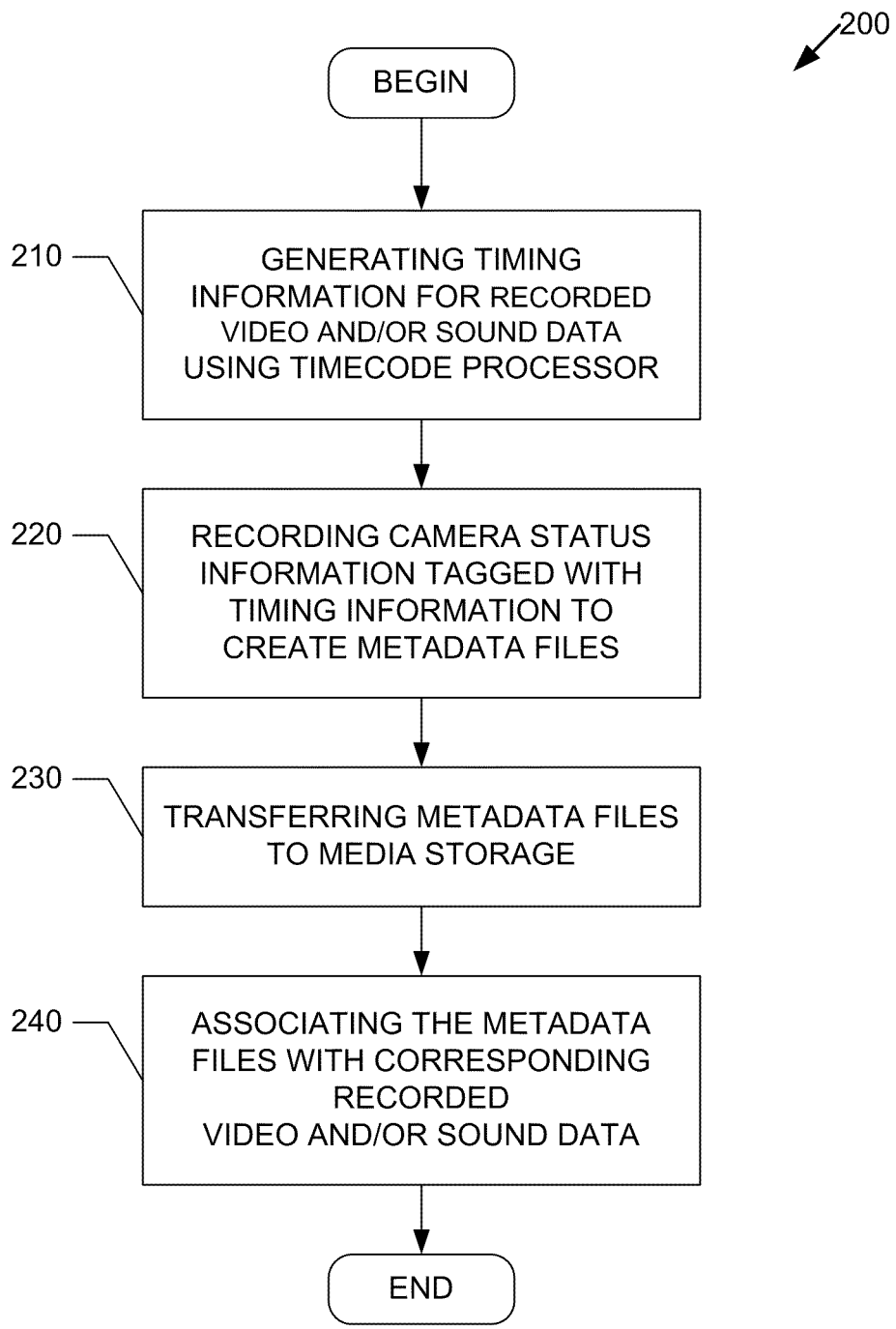
FIG. 2 shows a flowchart 200 illustrating a process for recording information about audio and video sequences on a logger device in accordance with one implementation of the present invention.

FIG. 2 shows a flowchart 200 illustrating a process for recording information about audio and video sequences on a logger device in accordance with one implementation of the present invention. In the illustrated implementation of FIG. 2, the process includes generating timing information for recorded video and/or sound data, at box 210, using the timecode manager 140. As stated above, the timecode manager 140 generates highly stable and conditioned timing information (e.g., timecode) for the logger device 100, and also provides this timing information to the video camera 150 for adjusting its timecode.

At box 220, camera status information is tagged with the generated timing information to create metadata files. The metadata files are transferred to media storage (e.g., a smart slate), at box 230. The metadata files are then associated with the corresponding recorded video and/or sound data, at box 240.

Figure 3:
FIG. 3 shows one example of a logger device 100 configured to present and record production information about audio and video sequences during movie or television production in accordance with one implementation of the present invention.
Figure 4:
FIG. 4 shows a side view of the logger device shown in FIG. 3.

FIG. 3 shows one example of a logger device 100 configured to present and record production information about audio and video sequences during movie or television production in accordance with one implementation of the present invention. The illustrated implementation of FIG. 3 shows connection ports for antenna (ANT), slate (SLATE), video camera (CAM), and USB. FIG. 4 shows a side view of the logger device 100 shown in FIG. 3. In this view, the configuration of status indicators (e.g., configured with light emitting diodes 410, 420), to indicate the status of the internal timecode generator, are clearly shown. For example, the two LEDs 410, 420 can be configured to indicate following configurations: (1) no RF present, and internal timecode generator not jammed; (2) RF present, and internal timecode generator jammed; (3) no RF present, and generator previously jammed and running on internal reference; and (4) low battery.

Figure 5:
FIG. 5 shows various cables which can be used to couple the logger device to the camera and other devices such as computer, smart slate, and/or antenna.

FIG. 5 shows various cables which can be used to couple the logger device 100 to the camera 150 and other devices such as computer, smart slate, and/or antenna.

Additional implementations include:
Logger incorporates a real time clock module with internal battery backup.
Logger captures relationship between camera timecode starts and stops and real time.
Logger captures relationship between sound timecode at camera start and stop and real time.
Logger creates accuracy correction factor for free running sound (e.g. non-received) timecode based on real time clock.
Logger can synthesize congruent sound timecode from real time clock in the event of a prolonged power disruption.
When desired, camera event data embedded in sound user bits can be replaced by received user bit data.
Logger can be interfaced to commercially available "dumb" timecode slate. In this mode it displays received timecode values and records timecode values at stick closures. Support for approximate timecode capture during "MOS" (i.e., silent) image capture is also provided.

In a further implementation, timecode reader 2 (144) may be bypassed by having the timecode manager 140 be directly triggered by an external contact closure such as that provided by a conventional (e.g. Denecke) electronic slate. In this mode, the received timecode processed by timecode reader 1 (142) is logged relative to the slate "clap", and subsequently used in the post production process to automatically synchronize sound and picture elements. Thus, this implementation opens up the use of the logger to those users of conventional slates who would benefit from enhanced functionality without the expense or complexity of moving to a full smart slate system as described in a related case (e.g., U.S. patent application Ser. No. 12/403,173).

Various implementations of the invention are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a computer-readable storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

The invention claimed is:

1. A method for logging events of a motion picture production on a logger device, the method comprising:
receiving production information and timing information triggered by an external device which records start and stop times of the events of the motion picture production;
generating a timecode and a sound timecode using the received timing information;
determining start and stop times of a video camera used in the motion picture production using the generated timecode; and
associating the production information with the corresponding start and stop times of the video camera,
wherein the timecode and the sound timecode enable the logger device to record the production information for use in an auto logging and synchronizing process during production of the motion picture.

2. The method of claim 1, wherein the external source is a slate.

3. The method of claim 1, further comprising:
receiving a camera timecode from the video camera;

adjusting the camera timecode in accordance with the generated timecode; and transmitting the adjusted camera timecode to the video camera.

4. The method of claim 3, wherein the camera timecode further comprises a video timecode and a sound timecode.

5. The method of claim 4, further comprising determining an offset between the video timecode and the sound timecode at a particular event of the motion picture production.

6. The method of claim 5, wherein the particular event is the start time of the video camera.

7. The method of claim 3, wherein adjusting the timecode comprises:

receiving real-time information from the real-time clock; and computing relationship between the sound timecode and the real-time information.

8. The method of claim 7, further comprising generating accuracy correction factor for the sound timecode based on the real-time information.

9. The method of claim 1, wherein the motion picture production includes a video production.

10. A logger device coupled to a video camera and an external source which records start and stop times of events of the motion picture production, the logger device comprising:

a receiver configured to receive production information and timing information triggered by the external source;

a timecode manager comprising at least one timecode generator, the timecode manager configured to generate a timecode and a sound timecode using the received timing information and to determine start and stop times of the video camera using the generated timecode; and a processor configured to associate the production information with the corresponding start and stop times of the video camera, wherein the timecode and the sound timecode enable the logger device to record the production information for use in an auto logging and synchronizing process during production of the motion picture.

11. The device of claim 10, wherein the external source is a slate.

12. The device of claim 10, wherein the timecode manager further comprises an adjustment unit configured to receive a camera timecode from the video camera, adjust the camera timecode in accordance with the generated timecode, and transmit the adjusted camera timecode to the video camera.

13. The device of claim 10, wherein the at least one timecode generator includes an on-board oscillator.

14. The device of claim 10, wherein the timecode is configured as frame counts.

15. The device of claim 10, further comprising a plurality of status indicators to indicate a status of the at least one timecode generator.

* * * * *